United States Patent [19]

Inselberg et al.

[11] Patent Number: 5,173,861
[45] Date of Patent: Dec. 22, 1992

[54] MOTION CONSTRAINTS USING PARTICLES

[75] Inventors: Alfred Inselberg; John S. Eickemeyer, both of Los Angeles; Alexander A. Hurwitz, Los Altos, all of Calif.

[73] Assignee: International Business Machines Corporation, Armonk, N.Y.

[21] Appl. No.: 629,286

[22] Filed: Dec. 18, 1990

[51] Int. Cl.⁵ .............................................. G01S 3/02
[52] U.S. Cl. .................................. 364/461; 364/439; 342/29
[58] Field of Search .................. 364/461, 460, 424.06; 342/29, 30, 36, 38

[56] References Cited

U.S. PATENT DOCUMENTS

| | | | |
|---|---|---|---|
| 4,063,073 | 12/1977 | Strayer | 364/439 |
| 4,104,512 | 8/1978 | Strayer | 364/439 |
| 4,623,966 | 11/1986 | O'Sullivan | 364/461 |
| 4,646,244 | 2/1987 | Bateman et al. | 364/461 |
| 4,706,198 | 11/1987 | Thurman | 364/439 |
| 4,823,272 | 4/1989 | Inselberg et al. | 364/461 |
| 4,839,658 | 6/1989 | Kathol et al. | 342/455 |
| 4,853,700 | 8/1989 | Funatsu et al. | 342/30 |
| 5,058,024 | 10/1991 | Inselberg | 364/461 |
| 5,077,673 | 12/1991 | Brodegard et al. | 364/461 |

OTHER PUBLICATIONS

S. Hauser, A. E. Gross, R. A. Thornese, (1983) "En Route Conflict Resolution Advisories", MTR-80W13, Rev. 2, Mitre Co., McLean Virginia.

Primary Examiner—Thomas G. Black
Attorney, Agent, or Firm—L. Keith Stephens; G. Marlin Knight

[57] ABSTRACT

A system for detecting and resolving conflicts between a plurality of aircraft or other objects on potentially conflicting trajectories in space. A two-dimensional graph generated on a processor-controlled display depicts the trajectory of one of the aircraft and creates particles that have identical velocity as the particular aircraft of interest. Each particle is at a different initial position from all other particles (in the sense of mathematical physics, a field is defined). That is, motion constraints are defined in terms of particles with specific characteristics and a algorithms for conflict avoidance are constructed by selecting a given particle which satisfies all of the constraints.

18 Claims, 5 Drawing Sheets

AIRCRAFT 1 (AC$_1$) VERSUS THE REMAINDER (AC$_2$–AC$_6$)

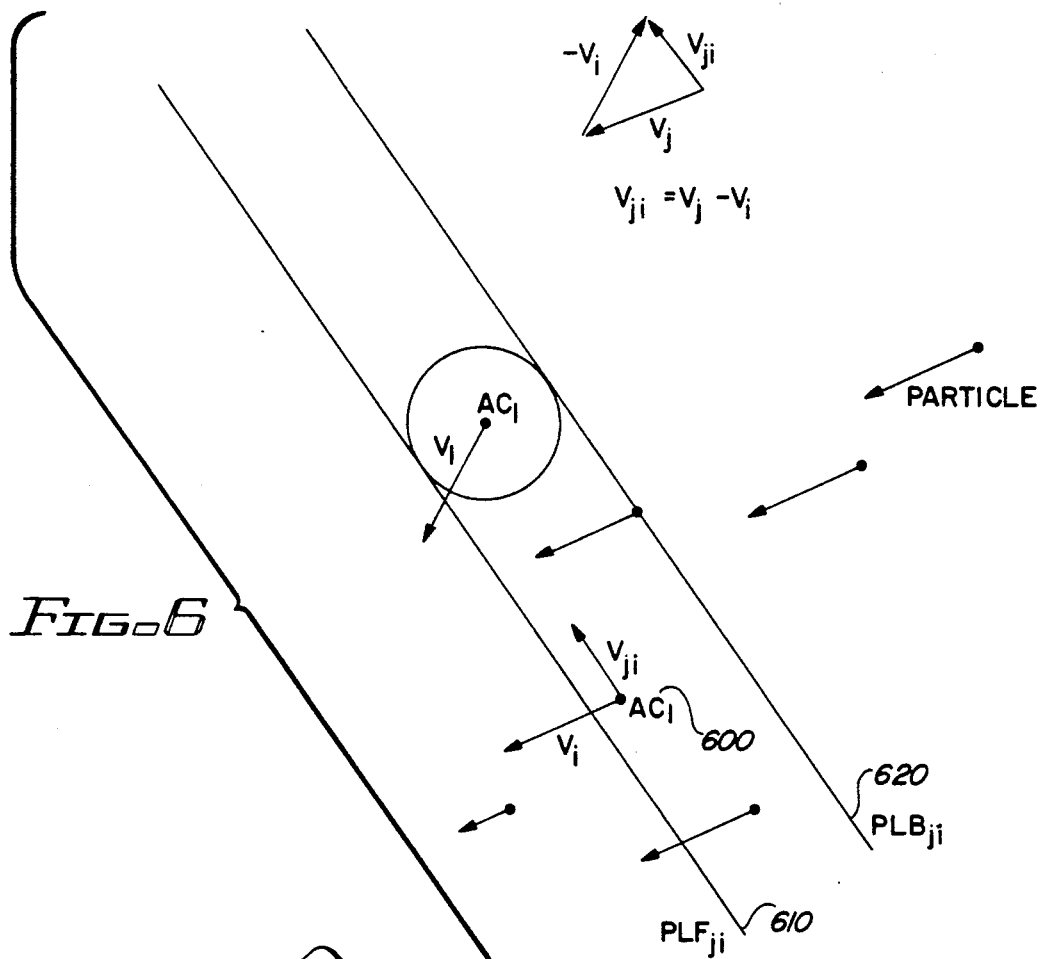
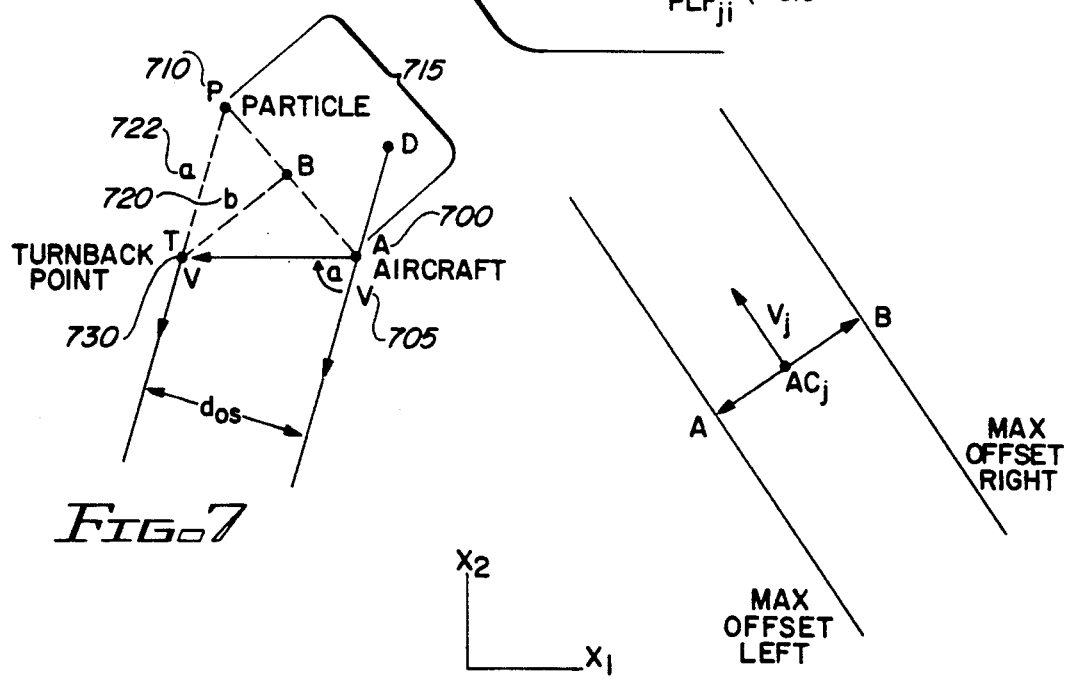

MOTION CONSTRAINTS USING PARTICLES

This invention relates to a method and apparatus for avoiding conflicts between multiple objects as they move in space on potentially conflicting trajectories, and relates more particularly to methods for early detection and resolution of such conflicts.

BACKGROUND OF THE INVENTION

U.S. Pat. No. 4,823,272, assigned to the assignee of the present invention, describes a method of displaying position and motion information of N variables for an arbitrary number of moving objects in space using a processor-controlled two-dimensional display. As illustrated, the display comprises a velocity axis and orthogonal thereto four parallel equally spaced axes. One of these four axes represents time and the other three the x, y and z spatial dimensions. On this two-dimensional display the trajectories of the objects to be monitored, such as aircraft, are depicted and their positions can be found at a specific instant in time. The plot for the position of each such object comprises a continuous multi-segmented line. If the line segments for the x, y, and z dimensions overlie each other for any two of the respective objects, but are offset in the time dimension, the objects will pass through the same point but not at the same time. Collision of the objects is indicated when line segments representing the time, x, y, and z dimensions for any two of the objects completely overlie each other.

When the plot for the respective objects indicates a potential conflict, the user, such as an Air Traffic Control (ATC) controller, has the trajectory of one of the objects modified to avoid collision. This method desirably provides a display of trajectory data to assist the user in resolving conflict; but it does not provide conflict detection as early as desirable in this age of fast moving aircraft.

S. Hauser, A. E. Gross, R. A. Tornese (1983), *En Route Conflict Resolution Advisories*, MTR-80W137, Rev. 2, Mitre Co., McLean, Virginia, discloses a method to avoid conflict between up to five aircraft where any one has a trajectory conflicting with that of the remaining four. Said method and also pair-wise and triple-wise resolution methods heretofore proposed resolve conflicts subset by subset, which leads to high complexity due to the need for rechecking and can result in worse conflicts than those resolved. Other examples of prior art conflict detection systems for air traffic control applications are disclosed in U.S. Pat. No(s). 4,646,244 and 4,063,073.

In Hughes Aircraft Company U.S. Pat. No. 4,839,658, a process is disclosed for establishing when pairs of en route aircraft are in potential en route conflict. A set of look ahead projections are prepared to determine if an aircraft will come into conflict with another en route to its destination. The process employs a finite (16) projections to determine if a conflict is likely to occur. This finite number of projections is a severe failing which limits the degrees of freedom from which to detect and prepare maneuvers to avoid collision.

In U.S. Pat. No. 5,058,024, a processor implemented method is described for detecting and resolving conflict between a plurality of aircraft or other objects, such as robot arms, on potentially conflicting trajectories in space. A two dimensional graph generated on a processor controlled display depicts the trajectory of a first aircraft and also the front and back limiting trajectory and the time remaining until a conflict between another of the aircraft with the front and back of the airspace associated with the first airplane. Possible conflict is resolved by diverting one of the aircraft by an appropriate maneuver to a conflict free path. A limitation, overcome in the subject invention, is that a single area of conflict is employed represented by the circumference of a circle around each airplane. This limitation is a severe failing which limits the degrees of freedom from which to detect and prepare maneuvers to avoid collision.

There is a need for a more flexible, complete apparatus and method for avoiding conflict and maintaining at least a desired degree of separation between a plurality of objects, such as aircraft, robot parts or other elements moving in respective trajectories in space. In other words, there is a need for a method which detects all potential conflicts, concurrently resolves all conflicts between all the objects, and provides instructions whereby conflict can be avoided with minimal trajectory changes of the involved objects.

SUMMARY OF THE INVENTION

To fulfill this goal in accordance with the subject invention, apparatus and method are disclosed for detecting and resolving conflicts between a plurality of aircraft or other objects on potentially conflicting trajectories in space. A two-dimensional graph generated on a processor-controlled display depicts the trajectory of one of the aircraft and creates particles that have identical velocity as the particular aircraft of interest. Each particle is at a different initial position from all other particles (in the sense of mathematical physics, a field is defined). Given a particle, a maneuver is determined which allows the aircraft to meet the particle in time to avoid other conflicts and match its motion thereafter. That is, motion constraints are defined in terms of particles with specific characteristics and algorithms for conflict avoidance are constructed by selecting a given particle which satisfies all of the constraints.

In the case where an object is moving with a constant velocity and each particle associated with the object is moving with the same velocity, there is a geometric construction to determine the constant speed maneuvers to meet and merge with the particle. There are also front and back limiting trajectories of the remaining aircraft.

The invention considers all points in space (particles) moving at the same speed and the same direction for a given aircraft or other object. Then an analysis is performed to determine all of the particles governed by the particular constraints the airplane is under can be reached by making one equal speed maneuver with maximum offset. This step involves the identification of all constraint line intersection points for each plane. All unreachable points are then eliminated. Then, for each plane, the system determines how much conflict the plane is in, how much conflict each of the plane's intersection points are in, and the single point that is in the least amount of conflict. Finally, the plane is maneuvered toward the point which decreases the amount of conflict the plane is in by the greatest amount. Constraint lines are then recomputed based on the plane's new position and the process is repeated until the level of conflict over all the planes is minimized.

The set of reachable particles is determined by an aircraft's maneuver constraint lines. The degree of conflict of the particles is determined by the relative coordinate constraint lines. The particles cannot all be checked. Thus, all but the most interesting particles are discarded. The most interesting points are at the intersection of constraint lines.

BRIEF DESCRIPTION OF THE DRAWINGS

FIG. 6 depicts a particle field for a particular aircraft in accordance with the present invention;

FIG. 7 depicts the relationship between a particle and a maneuver in accordance with the present invention;

FIG. 8 illustrates the maximum offset distance that a plane is allowed to deviate during maneuvers in accordance with the subject invention;

DESCRIPTION OF PREFERRED EMBODIMENT

Introduction

The term "conflict" as herein used, is defined as occurring when a preselected protected airspace enveloping one object is ingressed by another object. The term "trajectory", as herein used, connotes the position of an object as a function of time; whereas the term "path" is the line in space on which the object moves without reference to time.

This invention will be described, for sake of simplified illustration, in the context of methods of avoiding conflict between objects in the form of multiple aircraft and maintaining at least a desired preselected separation distance between them as they move in respective trajectories in space.

Figure 1:
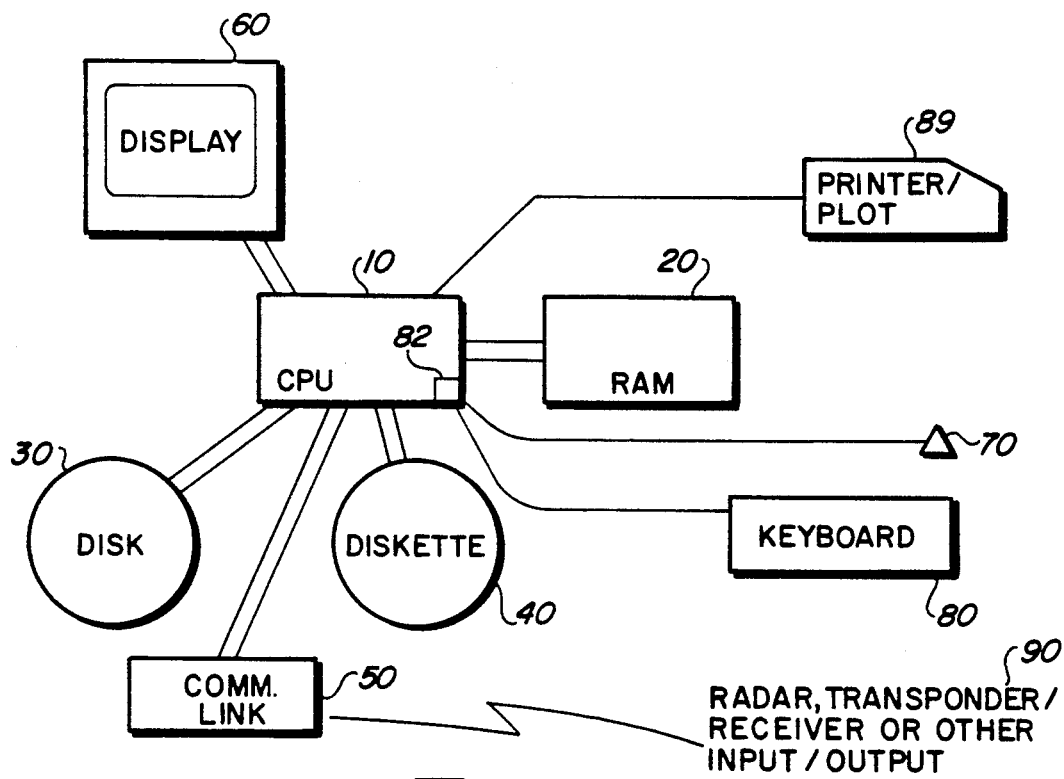
FIG. 1 is a hardware block diagram of the apparatus in accordance with the subject invention.

With reference to FIG. 1, the apparatus of the subject invention is a standard microprocessor such as that marketed by IBM under the product name of PS/2 or Risc System/6000. The CPU 10 can be an 80386 or 80486 processor for example. The CPU 10 has Direct Memory Access (DA) to the RAM 20, Disk 30 and Diskette 40. The CPU 10 can also transmit information via the Communication Link 50.

The CPU 10 also communicates to an attached graphic display to display information in EGA, VGA or other higher resolution modes. A mouse 70 is an optional cursor pointing device that is used to supplement the arrow keys of the keyboard 80 for specifying precise pointings on the graphic display 60. The keyboard is controlled by a keyboard adapter 82, including buffer means, in the CPU 10. Finally, a printer or plotter 89 can be attached to the CPU 10 to generate hardcopy of drawings.

The software used to awake the unique hardware features of this invention resides on the Disk 30 as do the drawings generated by a designer employing the invention. The software is also responsible for translating signals from the mouse/keyboard into appropriate system actions.

Figure 2:
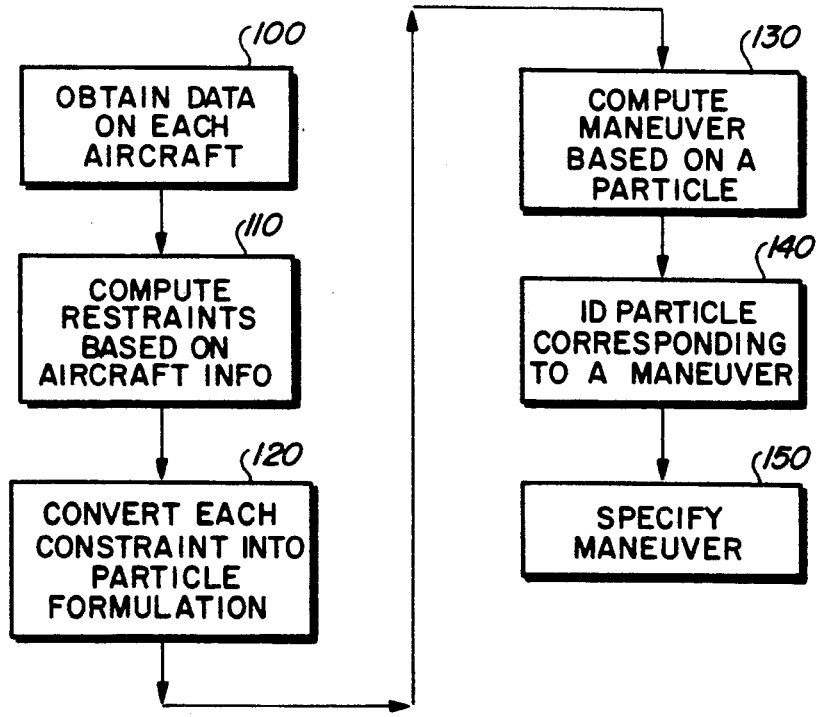
FIG. 2 is a flowchart of the logic of the subject invention in accordance with the subject invention.

The logic of the invention is set forth in the flowchart of FIG. 2. The first step is to obtain data on each aircraft as depicted at function block 100. The data includes velocity, location and altitude. This information comes to the system through the communication link 50 of FIG. 1 via radar or other sensory input as shown at label 90. Constraints are then calculated on the basis of details associated with the particular aircraft as shown in function block 110. Then, the constraints are converted into particle formulations as shown in function block 120. The system then computes the appropriate maneuver based on a particular particle meeting all the constraints as shown in function block 130. Finally, the particle corresponding to an appropriate maneuver is identified and the maneuver is specified to the aircraft as shown in function block 140 and output block 150. The particle and aircraft information is displayed as an output step. The details of the various hardware and software steps implementing the logic are discussed below.

There are two prior art methods of conflict detection in two dimensions where two objects are to be maintained separated by a distance R. Each object may be centered in a circle with a radius R/2, in which case to maintain separation the circles must not intersect but may just touch. Alternatively, one object may be centered in a circle with a radius R, in which case the separation distance R will be maintained so long as the trajectory of any other object does not intersect said circle. The invention will employ this alternative method because it simplifies the equations that must be solved. Conflict will occur when, and during the times that, the circle of radius R connoting protected airspace around said one object is penetrated by the trajectory of any other object. Actually, as will be seen presently there are two limiting trajectories (front and back) for each such other object.

According to a preferred form of one of the prior art methods, parallel coordinates are used to express as conflict resolution intervals (CRI), the trajectory of one object (aircraft $AC_1$) with respect to the trajectories of other objects (aircraft $AC_2$-$AC_6$) on a two-dimensional graph. The graph assists the user in selecting for said one object a conflict-free path parallel to the original one. CRI provides an earlier prediction of impending conflict than heretofore achieved with other prior art methods. However, when combined with the teaching of the subject invention, significant improvements are achieved.

Determining Front and Back Limiting Trajectories

Figure 3:
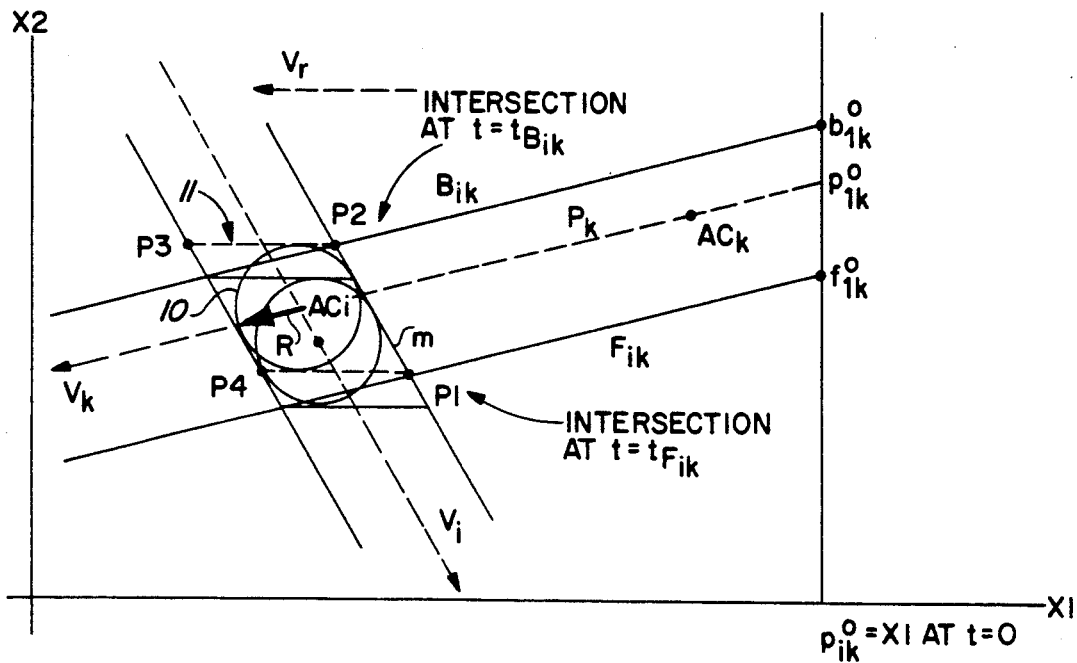
FIG. 3 is a schematic diagram depicting a prior art solution for calculating front and back limiting trajectories of a selected object with respect to the trajectory of a given object.

Assume initially that, as illustrated in FIG. 3, a circle 300 is centered about an aircraft $AC_i$ moving with a velocity $V_i$; that said circle envelopes and defines protected airspace of preselected shape and size which is not to be violated, such as an airspace having a radius of five nm corresponding to the standard in-flight horizontal separation distance prescribed by the ATC; and that an aircraft $AC_k$ is moving with a velocity $V_k$. Under the assumed condition, $V_r$, the relative velocity of $AC_k$ relative to $AC_i$, is $V_k-V_i$. The two tangents to circle 300 in the $V_i$ direction complete a parallelogram 311 that just encloses circle 300 around $AC_i$.

Assume now that a point along line $B_{ik}$ enters parallelogram 311 at vertex $P_2$. Under this assumed condition, the point will leave from vertex $P_3$, because the point travels in the direction of the relative velocity, $V_k-V_i$. Thus, the point along $B_{ik}$ is the closest it can be just touching the circle 300 around $AC_i$ from the back. Similarly, a point along line $F_{ik}$ which enters at vertex $P_1$ is the closest that said point can be to $AC_i$ and pass it from the front without touching circle 300, because the point will leave from vertex $P_4$. If any point between lines $B_{ik}$ and $F_{ik}$ moving at velocity V intersects the parallelogram between points $P_2$ and $P_1$, it must necessarily hit the protected airspace (circle 300) around $AC_i$. Hence, $B_{ik}$ and $F_{ik}$ are the back and front limiting trajectories, respectively, of $P_k$ that indicate whether or not there will be a conflict.

Figure 4:
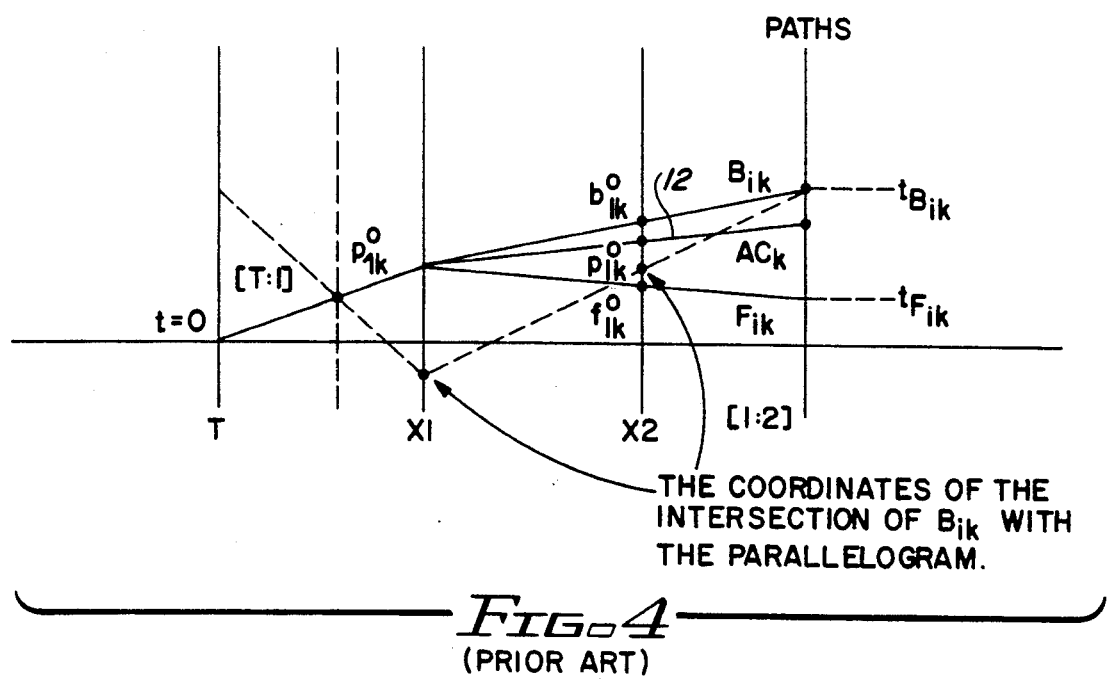
FIG. 4 is a schematic diagram depicting a prior art solution for calculating front and back limiting trajectories for a selected object expressed in parallel coordinates.

The information in FIG. 3 on the back and front limiting trajectories $B_{ik}$ and $F_{ik}$ may also be represented, as illustrated in FIG. 4, using parallel coordinates as heretofore proposed in the above-cited copending application. As described in said application, the horizontal axis in FIG. 4 represents velocity and T, X1 and X2 represent time and the x and y (e.g., longitude and latitude) spatial dimensions, respectively. X3, the z dimension, is not included, for sake of simplified illustration. It will hereafter be assumed that all objects are at the same elevation; i.e., all aircraft $AC_1$–$AC_6$ are at the same altitude.

In FIG. 4, the horizontal component at [T:1] between T and X1 represents the velocity of $AC_k$, and [1:2] represents the path of $AC_k$; i.e., how the x dimension X1 changes relative to the y dimension X2. At time t=0 on the time line T, $p°_{1k}$ and $p°_{2k}$ on the X1 and X2 lines, respectively, represent the x and y positions of $AC_k$. The line 312 extends through $p°_{1k}$ and $p°_{2k}$ to [1:2] to depict the path of $AC_k$. $B_{ik}$ and $F_{ik}$ depict the back and front limiting trajectories of $AC_k$ relative to $AC_i$.

Conflict Resolution Intervals

Figure 5:
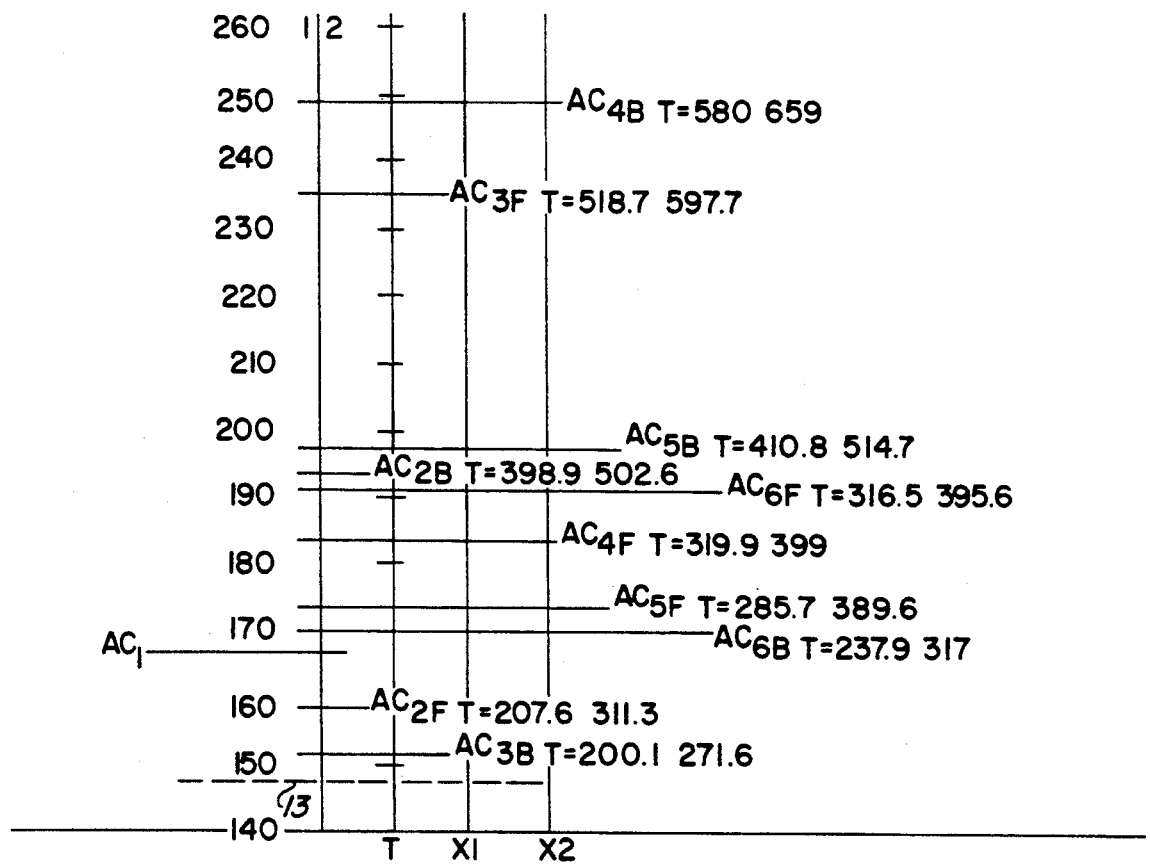
FIG. 5 is a graph depicting the trajectory of one object (AC) with respect to the front and back limiting trajectories of other objects ($AC_2$-$AC_6$) on potentially conflicting courses with the one object.

Assume now that conflict is to be resolved between aircraft $AC_1$ and five other aircraft, $AC_2$–$AC_6$. The back and front limiting trajectories of $AC_2$–$AC_6$ at point [1:2] are depicted, according to the invention, on the CRI graph (FIG. 3). The vertical scale is units of horizontal distance. The horizontal lines F and B represent the front and back limiting trajectories for aircraft $AC_2$–$AC_6$ and are obtained by the method illustrated in FIG. 4 for $t_{Bik}$ and $t_{Fik}$ at point [1:2]. As illustrated in FIG. 5, the path of AC lies between the front and back limiting trajectories of both $AC_2$ and $AC_3$; and hence AC is in conflict with only these aircraft.

It will thus be seen that, in event of conflict, the closest conflict-free trajectory for a particular aircraft under examination is achieved by diverting it in a single appropriate maneuver to a trajectory that is parallel to its original trajectory and, as depicted in FIG. 5, is not within the F and B limiting trajectories of any other aircraft.

The particular types of aircraft involved and their closing velocities will already have been programmed into the ATC processor from the aircraft identification and transponder information provided to ATC. The preferred evasive maneuvers for each type of aircraft, taking into account its performance characteristics and the time required, will have been precomputed, modeled and tested for feasibility to generate a library of maneuver routines which are stored in memory to resolve conflict under various operating conditions, such as closing velocities.

The processor will cause the appropriate one of these routines to be displayed for the particular conflict-resolving evasive maneuver taking into account the respective aircraft types and operating conditions. All routines will be based upon the involved aircraft having the same velocity at completion of the maneuver as it had upon its inception, although the interim velocity may be somewhat greater depending upon the degree of deviation from a straight line path.

Thus, the position of [T:1] in FIG. 4 will be the same at the end of the maneuver as it was at the beginning as illustrated in FIG. 5 because the velocity of the involved aircraft at the end will have been restored to that at the beginning of the maneuver.

Particle Field

A principle inventive feature of the subject invention, which improves upon the technique described above, is the definition of particle fields. A single particle field is defined for each of a set of N aircraft. The aircraft can be considered as moving points in a plane. As shown in FIG. 6, at t=0 for each aircraft $AC_j$ 600, every point of the plane is assigned an identical constant velocity vector $V_j$ as $AC_j$. Subsequently, for t>0 every point starting from its initial position moves with the velocity $V_j$. A subset (which may be empty) of these particles will have properties which are useful for constrained conflict resolution. For example, all particles whose starting position is on the line $PLB_{ji}$ shown in FIG. 6 and below the point of tangency with the circle centered at $AC_i$ will in due course scrape the circle from the back. Similarly, the particles on $PLF_{ji}$ will eventually scrape the circle from the front. All particles lying between the lines, and below the points of tangency, will in time collide with the circle. If the circle represents the moving airspace that is to be avoided, the aircraft $AC_j$ must be maneuvered to resolve the conflict.

Assume that aircraft $AC_j$ should turn after the maneuver to a path parallel to its original one and continue traveling with the same velocity $V_j$; that is wind up traveling along a line through one of the particles. The challenge here is to find a set of desirable particles whose behavior we want $AC_j$ to imitate in the neighborhood of the circle (i.e. all those avoiding it). If such particles are found, the next task is to find the maneuvers that satisfy the constraints which are discussed below. Then, $AC_j$ must behave like the desirable particles in time to avoid the conflict with all of the aircraft. If there are other moving circles, then the region of particles which will avoid conflict with all of the circle regions is the intersection of all the regions outside the pair of tangent lines to each circle.

The maneuvers corresponding to particles on the scrape lines will typically involve the minimum displacement (in the perpendicular direction) of the parallel paths. In the remainder, the constructions involved in finding the set of particles (i.e. their initial positions) satisfying a variety of constraints are described.

The point set intersection of these sets (if not empty) contains the set of particles which satisfy all of the constraints. Thus, the corresponding aircraft maneuvers can be constructed resulting in constrained conflict resolution.

FIG. 6 represents the particle field for $AC_j$ 600. The particles on the lines $PLF_{ji}$ 610, $PLB_{ji}$ 620 which are tangent to the circle, will eventually scrape the circle from the back or front respectively.

Correspondence between Maneuvers and Particles

The constructions in the next two sections are with reference to FIG. 7. FIG. 7 shows the relationship between a particle and a maneuver. The constructions in the section only use maneuvers that keep the speed of the maneuvering aircraft constant, and return the aircraft to its original course (parallel offset maneuver).

A maneuver is constructed based on a given particle (PTOM). Given an aircraft located at position A 700, with a velocity V 705, and a particle associated with the aircraft 710, the maneuver corresponding to the particle is found by connecting the position of the aircraft to be maneuvered, A 700, and the position of the particle, P 710, by a straight line segment, PA 715. Then, a line is drawn parallel to the direction of the velocity, V 705, of the aircraft through the position P 710. Next, the system must construct a perpendicular bisector, b 720, of the line segment PA 715, and find the intersection of the line b 720 and the line a 722 at the point T 730. The triangle PTA is an isosceles triangle with side TP equal to TA.

Maneuver 1. Turn the aircraft to travel along AT from A to T.

Maneuver 2. At the position T, the turn back point, turn the aircraft back to its original direction along the line a. Because TA is equal to TP, and both the aircraft and the particle are travelling with the same speed, they will meet at T. Turning back at T causes the aircraft and the particle to travel together. Effectively, the aircraft was maneuvered at equal speed to a trajectory parallel to its original trajectory offset by some distance $d_{os}$.

The next step is to find the particle corresponding to a maneuver (MTOP). Again looking at FIG. 7, assume the first and second maneuver described above are prescribed. That is, a turn alpha degrees and a return to the aircraft's original course at point T. Construct the line a through T parallel to the velocity vector V. Then, measure off a distance back along a from T in the opposite direction of V. Call the point on a at this distance P. Alternatively, extend the line parallel to the velocity vector V backwards through A, and find the bisector of the supplement of the angle alpha, which is the line through AB. Then, find the intersection, P, of AB and the line through T from step 1. The triangle ATP can be shown to be isosceles so that Step 2 is equivalent to Step 3. The position of P is the position of the required particle because by construction PTA is an isosceles triangle and a particle at P would meet the aircraft at T.

List of Constraints

This section lists each of the constraints used in a specific FAA problem and shows how the constraint is expressed as a curve that selects a subset of particles.

Notation and conventions

Throughout this section when listing the constraints the following notations and conventions are used:

| | |
|---|---|
| n | The number of aircraft under consideration. |
| $AC_j$, j = 1,2, . . . , n | Aircraft j and its position. The coordinates of $AC_j$ are $(a_{1j}, a_{2j})$. |
| $V_j$ | The velocity vector of $AC_j$. The velocity components of $V_j$ are $(V_{1j}, V_{2j})$. |
| $|V_j|$ | The magnitude (speed) of the velocity vector $AC_j$. |
| $l(x_1, x_2)$ | a linear function that is used to define the line l. It will usually be defined so that some designated point, say $B = (b_1, b_2)$ not on the line has a negative value. That is, $l(b_1, b_2)$ lt 0. This is done because particles on one side of a line (curve) satisfy the constraints that define the line and particles on the other side do not. The zero or negative value indicates that the constraint has been satisfied. The usual measures of conflict will sum the nonnegative values of the individual measures. Then, if that sum is zero all the constraints are satisfied. Further, these linear functions will be used in other patents for finding solutions that satisfy the constraints. |

Note:
(1) any line l divides the plane into three set of points:
(2) all points on the line yield a value of zero for $l(x_1, x_2)$;
(3) all points on one side yield a value greater than zero; and
(4) all points on the other side yield a value less than zero.

Flag constraints depend only on $AC_j$. These constraints apply only to the maneuvers a single aircraft can make independently of conflicts with other aircraft. Max offset left (right): There is a limited distance, given as a parameter called the maximum offset distance, that an aircraft is allowed to deviate, while maneuvering, from its original course. This variable is the distance between a line in the direction of the original course and a line in the direction of the new parallel course. FIG. 8 depicts the maximum offset variables in a graphic manner.

| Calculation of Max Offset Lines | |
|---|---|
| Name | Max Offset Line Right (Left) |
| Notation | $l_{MR}, l_{ML}$. |
| Given Data | $AC_j, V_j, D_{os}$ |

Given an aircraft $AC_j$ at $(a_{1j}, a_{2j})$ with velocity $V_j = (v_{1j}, v_{2j})$, and a maximum offset distance $d_{OS}$, find the equations of the left and right maximum offset lines.

An equation of the line, l, through $AC_j$ with a slope equal to the slope of $V_j$ when $v_{1j} <>0$ is given by:

$$v_{2j}/v_{1j} = (x_2 - a_{2j})/(x_1 - a_{1j})$$

or, $$l(x_1, x_2) = v_{2j}x_1 - v_{1j}x_2 + v_{1j}a_{2j} - v_{2j}a_{1j} = 0$$

The lines, $l_{or}$, offset right, and $l_{oL}$, offset left, that are parallel to l at a distance d are represented by the equations:

$$l_{OR}(x_1, x_2) = v_{2j}x_1 - v_{1j}x_2 + v_{1j}a_{2j} - v_{2j}a_{1j} - d_{o\kappa}|V_j| = 0 \quad (I)$$

and $$l_{OL}(x_1, x_2) = v_{2j}x_1 - v_{1j}x_2 + v_{1j}a_{2j} - v_{2j}a_{1j} + d_{o\kappa}|V_j| = 0 \quad (II)$$

respectively, where the magnitude of the velocity vector $V_j$ is:

$$|V_j| = sqrt\,(v_{1j}{}2 + v_{2j}{}2)$$

It can be verified that $$l_{OR}\,(a_{1j},\,a_{2j}) < 0.$$

and $$l_{OL}\,(a_{1j},\,a_{2j}) < 0$$

and because the cross product $$(v_{1j},\,v_{2j}) \times (v_{2j},\,-v_{1j}) < 0.$$

the line $l_{OR}$ is to the right of $AC_j$ with reference to the direction of $V_j$ and $l_{OL}$ is to the left.

Infinite Slope Case

If $F_{1j} = 0$, then the equations are as follows:

$$l(x_1, x_2) = x_1 - a_1 = 0$$

The lines, $l_{OR}$, offset right, and $l_{OL}$, offset left, that are parallel to l at a distance d are represented by the equations:

$$l_{OR}\,(x_1,\,x_2) = x_1 - a_{1j} - d = 0$$

and $$l_{OL}\,(x_1,\,x_2) = -(x_1 - a_{1j} + d) = 0$$

respectively and therefore equations (I) and (II) are still valid because $v_{1j} = 0$. It can be verified that $$l_{OR}\,(a_{1j},\,a_{2j}) < 0$$

and $$l_{OL}\,(a_{1j},\,a_{2j}) < 0$$

and because the cross product $$(v_{1j},\,v_{2j}) \times (v_{2j},\,-v_{1j}) < 0,$$

the line $l_{OR}$ is to the right of $AC_j$ with reference to the direction of $V_j$ and $l_{OL}$ is to the left.

Particle Region

With the maximum offset lines (left and right) defined as above, the particle region corresponding to the subset of particles for $AC_j$ that will satisfy the maximum offset constraints can be defined. All particles between the lines $l_{OR}$ and $l_{OL}$ correspond to maneuvers that satisfy these constraints. In a formula, the subset is:

$$\{P \mid P = (p_1, p_2),\, l_{OR}\,(p_1, p_2) <= 0,$$
$$\text{and } l_{OL}\,(p_1, p_2) <= 0\,\}$$

Infinite Turn Back Line

| Name | Infinite Turn Back Line |
|---|---|
| Notation | $l_{infinity}$ |
| Given Data | $AC_j$, $V_j$ |

When an aircraft, $AC_j$, maneuvers, it first turns, then it meets a selected particle, and then it turns back at the turn back time $t_{tb}$. Particles that lie on the line perpendicular to $v_j$ through $AC_j$ are such that $AC_j$ will attempt to meet the particle by travelling parallel to it. Hence, the meeting will take place at infinity. Therefore all feasible particles must be behind the infinite turn back line in order for $AC_j$ to be able to meet them in a finite amount of time.

Calculation of Infinite Turn Back Line

A line $l_{infinity}$ perpendicular to $V_j$ through $AC_j$ where $v_{2j} <> 0$ is given by $$-v_{1j}/v_{2j} = (x_2 - a_{2j})/(x_1 a_{1j})$$

or, $$l_{infinity}\,(x_1, x_2) = v_{1j}x_1$$
$$+ v_{2j}x_2 - v_{2j}a_{2j} - v_{1j}a_{1j} = 0 \quad (III)$$

The signs are chosen for $l_{infinity}x_1$, $x_2$ so that for points "behind" the line (i.e. in a direction opposite to $V_j$ $l_{infinity}(x_1, x_j) < 0$.

Infinite Slope Case

If $v_{2j} = 0$, then $$l_{infinity}(x_1, x_2) = -x_1 + a_{1j} = 0$$

and therefore equation (3) is still valid.

Particle Region

The particle region for $l_{infinity}$ is the set of all points behind it. A point, $(b_1, b_2)$, is behind $l_{infinity}$ if $l_{infinity}\,(b_1, b_2) < 0$.

Max Turn Angle Left (Right)

| Name | Max Turn Angle Right (Left) |
|---|---|
| Notation | $l_{MAR}(l_{MAL})$ |
| Given Data | $AC_j$, $V_j$, theta$_{MAR}$, (theta$_{MAL}$) |

Figure 9:
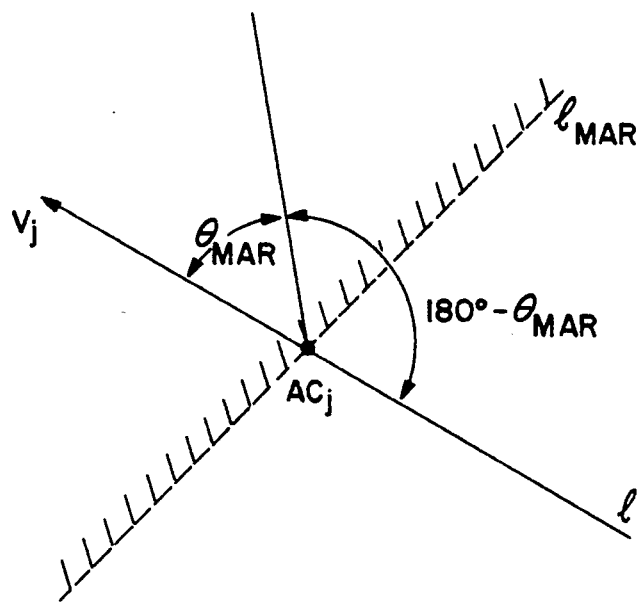
FIG. 9 shows the construction of a constraint line for a maximum turning angle to the right in accordance with the subject invention.

When the right turn angle of $AC_j$ is constrained by some maximum value, theta$_{MAR}$, the corresponding constraint line is constructed as follows, see FIG. 9.

Construction of Constraint Line for Max Turn

First, pass a line l, through $AC_j$ in the direction of $V_j$. Second, pass a line through $AC_j$ at an angle theta$_{MAR}$ clockwise from the positive direction of $v_j$. Bisect the supplement angle (180 degrees − theta$_{MAR}$) to theta$_{MAR}$ with the line $l_{MAR}$.

The line $l_{MAR}$ is the required constraint line. The linear form is $l_{MAR}\,(x_1, x_2)$ where the equation for the line is $l_{MAR}\,(x_1, x_2) = 0$ and has the properties:

$l_{MAR}\,(a_{1j}, a_{2j}) = 0$ and for any point on the side of the line in the direction of $V_j$ the linear form is negative.

The side is indicated by shading in the Figure and also by the + and − signs.

Conflict Constraints Depending on $AC_j$ v. $AC_i$

Figure 10:
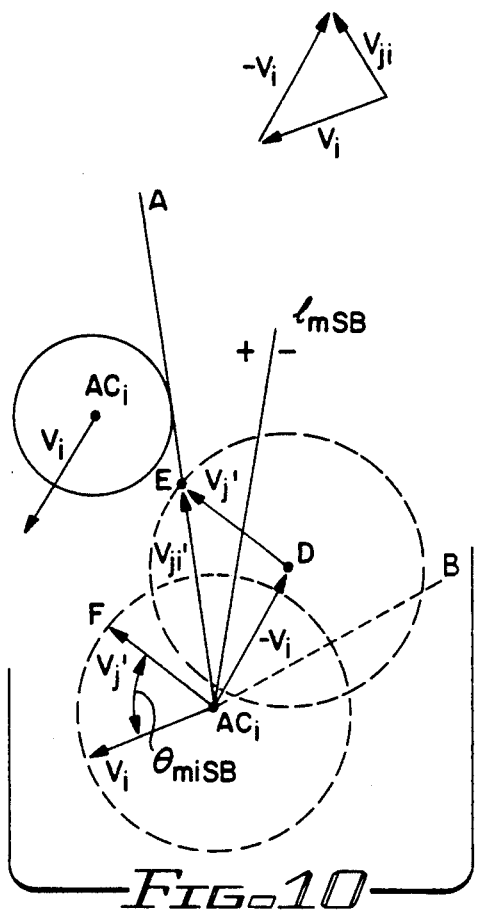
FIG. 10 illustrates a minimum turn to avoid a collision and continue with a parallel offset maneuver in accordance with the subject invention.

If the maneuvering aircraft, $AC_j$, is in conflict with an aircraft $AC_i$, then $AC_j$ must be maneuvered to avoid such a conflict. This calculation first requires a slight reformulation of the problem. Instead of a circle of radius equal to the separation assurance (e.g. 2.5 nm.) around each aircraft, a circle of radius twice the separation assurance (e.g. 5 nm.) is drawn around $AC_i$ and the circle around $AC_j$ is reduced to a point. With this change, the conflict problem is restated so that the trajectory of $AC_j$ must avoid crossing the circle around $AC_i$ (by definition it can be tangent without causing a conflict). FIG. 10 illustrates this point with a graphic display.

Required to Avoid Conflict During a Maneuver

This may be accomplished with no change in trajectory of $AC_i$. If the path of $AC_j$ scrapes (is tangent at some point in time) to the separation assurance circle around $AC_i$, then $AC_j$ would pass either in back of $AC_i$ or in front using the direction of $AC_i$ to discern back from front. An exception to this would be if $AC_i$ and $AC_j$ were headed directly toward each other. In that case, back and front could not be defined and passing to the right is arbitrarily defined here as "back" and to the left as "front".

Min Angle to Scrape Circle in the Back

| Name | Min Turn Scrape Back |
|---|---|
| Notation | $theta_{mSB}$ |
| Given Data | $AC_j, AC_i, V_j, V_i$ |

See FIG. 10 for an example of a minimum angle to scrape circle in the back.

Steps to Compute $theta_{mSB}$

The plan is to find the right path in moving coordinates for just scraping the circle. This involves finding the relative velocity (and the corresponding absolute velocity) for $AC_j$ with the same magnitude as $V_j$ tangent to the circle centered on $AC_i$ and finally finding the constraint line corresponding to the new velocity for $AC_j$. The constructions are all carried out using $AC_j$ as an origin for the velocity vectors.

First, construct a tangent line from $AC_j$ to the back of the circle centered at $AC_i$ and let A and E be points on this line. If $AC_j$ follows this path then it is easy to see in moving coordinates that it will just scrape the circle at one point and pass in back of $AC_i$. Next, draw a circle of radius $|V_j|$ with center $AC_j$. Then, locate D, the position of $AC_j - V_i$. Also, find the intersection of the circle with center at D and radius $|V_j|$ with the tangent line at E. The relative vector $V'_{ji}$ is therefore determined as the vector from $AC_j$ to E and the vector $V'_j$ is determined as the vector from D to E such that $AC_j$ moving with $V'_j$ will just scrape the circle from the back with the same magnitude as $V_j$. $V'_{ji} = V'_j - V_i$, so that V is the correct relative vector corresponding to $V'_j$.

To complete the second part of the Parallel Offset maneuver, i.e. the turn of $AC_j$ back in the direction of $v_j$, proceed to construct a line through $AC_j$ in the direction of $V_j$ letting B be a point on the line. Construct the line $l_{mSB}$ as the bisector of angle F $AC_j$ B which is the supplement of the angle between $V_j$ and $V'_j$ with vertex at $AC_j$. Particles in front of $l_{mSB}$, that is, in the direction of $V_j$ do not satisfy the constraint and the value of the linear function $l_{mSB}(x_1, x_2)$ is positive for such particles.

The region on the side marked with a "−" behind $l_{mSB}$ contains particles that satisfy the constraint. These are the particles that $AC_j$ can use to avoid circle $AC_i$ when turning back in the direction of $V_j$ to complete the Parallel Offset maneuver. The output here is the constraint line $l_{mSB}$.

Particle Line Front Scrape

Again this may be accomplished without change in trajectory of $AC_i$.

Min Angle to Scrape Circle in Front

| Name | Min Turn Scrape Front |
|---|---|
| Notation | $theta_{mSF}$ |
| Given Data | $AC_j, AC_i, V_j, V_i$ |
| Steps to Compute | $theta_{mSG}$ |

The construction is the same as the previous one (for the Min Angle to Scrape Circle in Back) the difference is in step I where the tangent line from $AC_j$ is now drawn to the front of the circle centered at $AC_j$. All the other steps are identical. The output of the construction is the constraint line $l_{mSB}$.

Limit on Possible Maneuver of $AC_j$

| Name | Maximum Achievable Relative Angle |
|---|---|
| Notation | $theta_{MARV}$ |
| Given Data | $AC_j, AC_i, V_j, V_i$ |

Figure 12:
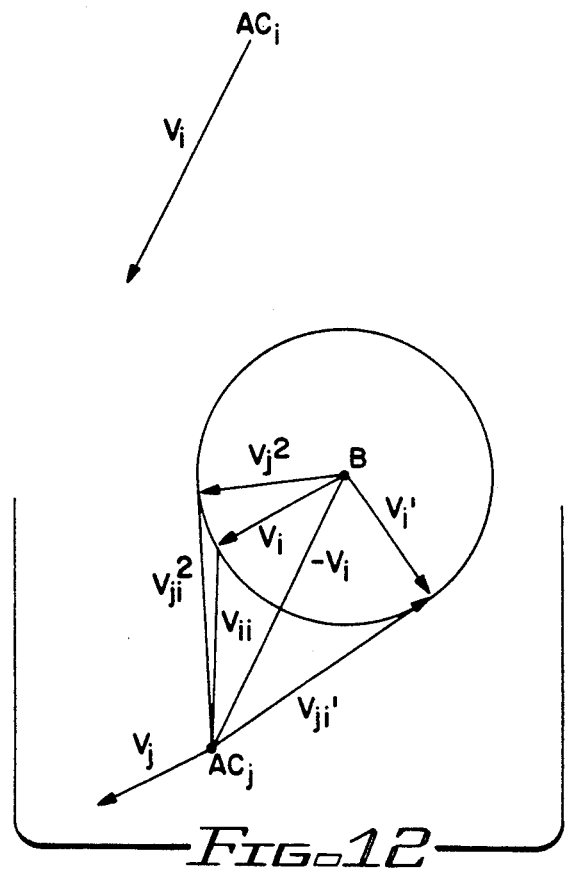
FIG. 12 presents the effect of a velocity vector in restricting the angle of angles in accordance with the subject invention.
Figure 11:
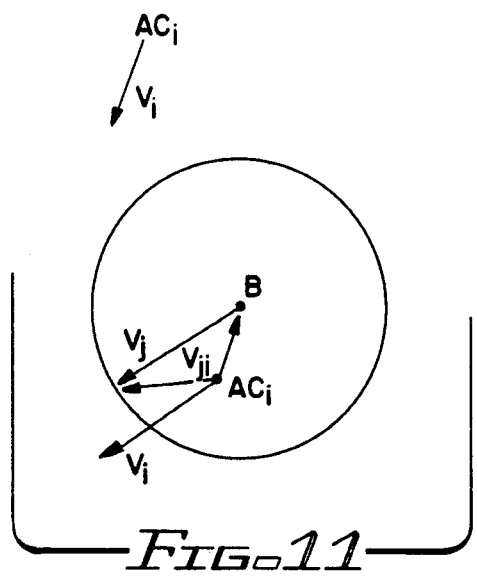
FIG. 11 demonstrates graphically a condition in which all relative angles are attainable in accordance with the subject invention.

When $|V_i| < |V_j|$ as $V_j$ rotates about $AC_j$ with $|V_j|$ =constant and $V_i$ fixed, the angle of $V'_{ji}$ is not constrained and can range through 360 degrees as shown in FIG. 11. Then, in FIG. 12, $|V_j| < |V_i|$ and the relative velocity vector $V_{ji}$ has a restricted range of angles.

Otherwise, when $|V_i| > |V_j|$ the range of $V'_{ji}$ is limited. The construction for finding this range is given next and shown in FIG. 12. First, at A place tail of vector $-V_i$. Then, at the head of vector $-V_i$, point B, draw circle with radius $|V_j|$. Call the circle C. Next, from $AC_j$ draw the two tangents to the circle C which provide the attainable range of $V'_{ji}$ with any angle in that range being achievable. Then, let the relative vectors $V^1_{ji}$ and $V^2_{ji}$ be along the tangents to C and $V^1_j, V^2_j$ be the corresponding absolute vectors. Clearly, $|V_j| = |V^1_j| = |V^2_j|$ with $F_{ji} = V_j - V_i$, $V^1_{ji} = V^1_j - V_i$ and $V^2_{ji} = V^2_j - V_i$. The vectors $V^1_{ji}$ and $V^2_{ji}$ are the extreme positions achievable for any relative velocities subject to the given constraints.

Figure 13:
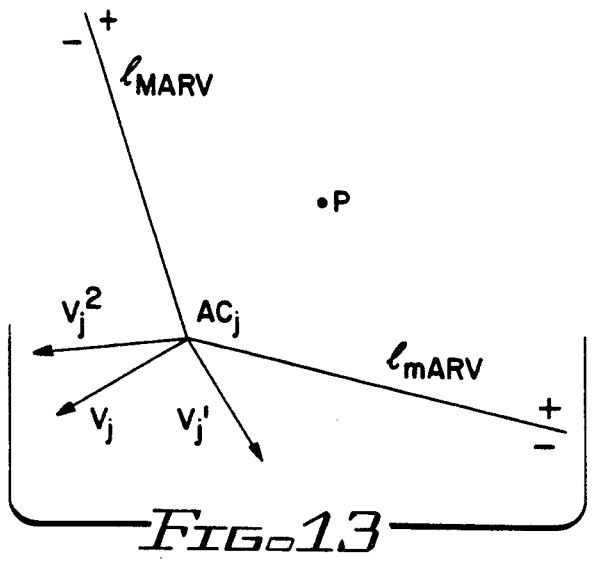
FIG. 13 expresses achievable angles for particle constraint lines in accordance with the subject invention.

For an equal speed parallel offset maneuver with $AC_j$ changing velocity from $V_j$ to $V^1_j$ the corresponding constraint line $l_{mARV}$ (in the manner of the MTOP procedure), as shown in FIG. 13 is the bisector of the supplement of the angle between $V_j$ and $V^1_j$ and provides the Maximum Achievable Relative Vector Constraint Line. Using $V^2_j$ instead of $V^1_j$ in the previous step provides the corresponding Minimum Achievable Relative Vector Constraint Line. The region between the plus sides of $l_{mARV}$ and $l_{mARV}$ provides the range of achievable directions of the relative vector $V'_{ji}$.

While the invention has been described in terms of a preferred embodiment in a specific system environment, those skilled in the art recognize that the invention can be practiced, with modification, in other and different hardware and software environments within the spirit and scope of the appended claims.

We claim:

1. A method for using a computer system, having a processor and memory, to find a set of conflict avoidance maneuvers for a maneuverable object which must be kept separated by a safe distance from one or more other objects which are co-planar with the maneuverable object, the maneuverable object and one of the other objects having respective initial velocities and trajectories which if unchanged for time interval T would cause the safe distance to be violated, comprising the steps of:

defining, using the processor, a first set of hypothetical particles having a velocity equal to the initial velocity of the maneuverable object and being co-planar with the maneuverable object and the other objects;

projecting, using the processor, trajectories for the first set of hypothetical particles and for the other objects through time T;

determining, using the processor, a second set of hypothetical particles, from the first set of hypothetical particles, which during time interval T have trajectories which pass no closer than the safe distance to the trajectory of any of the other objects;

finding, using the processor, a third set of hypothetical particles, from the second set of hypothetical particles, to which the maneuverable object can be maneuvered using a corresponding set of maneuvers based on predetermined constraints on the maneuverability of the maneuverable object; and storing in the memory of the computer system the corresponding set of maneuvers for s elected one of the hypothetical particles from the third set of hypothetical particles.

2. The method of claim 1 wherein the maneuverable object is an aircraft in flight.

3. The method of claim 2 further comprising the step of displaying the corresponding set of maneuvers in human readable form on a display device.

4. The method of claim 2 further comprising the step of transmitting the corresponding set of maneuvers to the maneuverable object.

5. The method of claim 2 wherein the plane of the first set of hypothetical particles is horizontal to the earth's surface.

6. The method of claim 2 wherein the corresponding set of maneuvers results in a final velocity of the maneuverable object which is equal to the initial velocity of the maneuverable object.

7. The method of claim 2 wherein the selected one of the hypothetical particles from the third set of hypothetical particles has a trajectory which causes it to pass at the safe distance from one of the other objects.

8. The method of claim 1 wherein the first set of hypothetical particles is a field.

9. The method of claim 1 wherein each set of maneuvers corresponding to a particle comprises a first lateral turn of alpha degrees and a second lateral turn of minus alpha degrees which together will return the first maneuverable objects to a final trajectory which is parallel to and laterally offset from the initial trajectory.

10. A system, having a processor and memory, for finding a set of conflict avoidance maneuvers for a maneuverable object which must be kept separated by a safe distance from one or more other objects which are co-planar with the maneuverable object, the maneuverable object and one of the other objects having respective initial velocities and trajectories which if unchanged for time interval T would cause the safe distance to be violated, comprising:

means for defining, using the processor, a first set of hypothetical particles having a velocity equal to the initial velocity of the maneuverable object and being co-planar with the maneuverable object and the other objects;

means for projecting, using the processor, trajectories for the first set of hypothetical particles and for the other objects through time T;

means for determining, using the processor, a second set of hypothetical particles, from the first set of hypothetical particles, which during time interval T have trajectories which pass no closer than the safe distance to the trajectory of any of the other objects;

means for finding, using the processor, a third set of hypothetical particles, from the second set of hypothetical particles to which the maneuverable object can be maneuvered using a corresponding set of maneuvers based on predetermined constraints on the maneuverability of the maneuverable object; and means for storing in the memory of the system the corresponding set of maneuvers for a selected one of the hypothetical particles from the third set of hypothetical particles.

11. The system of claim 10 wherein the maneuverable object is an aircraft in flight.

12. The system of claim 11 further comprising means for displaying the corresponding set of maneuvers in human readable form on a display device.

13. The system of claim 11 further comprising means for transmitting the corresponding set of maneuvers to the maneuverable object.

14. The system of claim 11 wherein the plane of the first set of hypothetical particles is horizontal to the earth's surface.

15. The system of claim 11 wherein the corresponding set of maneuvers results in a final velocity of the maneuverable object which is equal to the initial velocity of the maneuverable object.

16. The system of claim 11 wherein the selected one of the hypothetical particles from the third set of hypothetical particles has a trajectory which causes it to pass at the safe distance from one of the other objects.

17. The system of claim 10 wherein the first set of hypothetical particles is a field.

18. The system of claim 10 wherein each set of maneuvers corresponding to a particle comprises a first lateral turn of alpha degrees and a second lateral turn of minus alpha degrees which together will return the maneuverable object to a final trajectory which is parallel to and laterally offset from the initial trajectory.

* * * * *